May 14, 1946.  M. O'FARRELL  2,400,206
TOOL RETAINER
Filed April 20, 1944.  2 Sheets-Sheet 1

INVENTOR
MATTHEW O'FARRELL
BY
Raymond G. Mullee
ATTORNEY

May 14, 1946.        M. O'FARRELL        2,400,206
TOOL RETAINER
Filed April 20, 1944        2 Sheets-Sheet 2
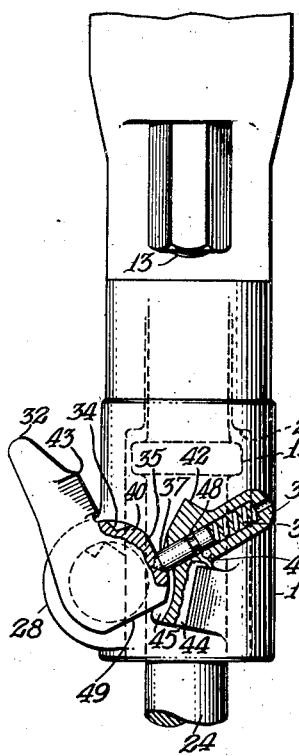
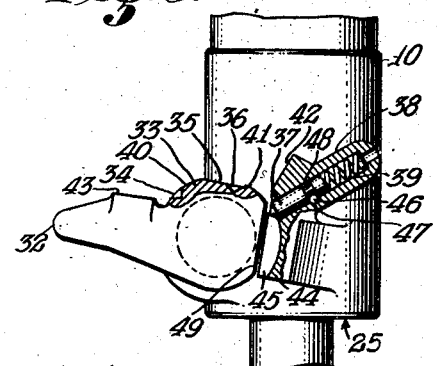
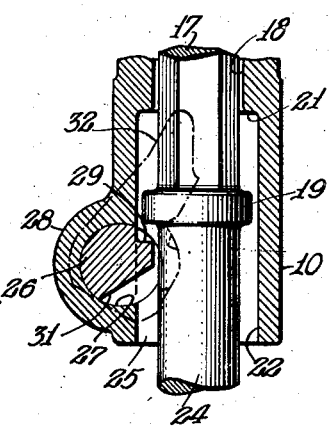
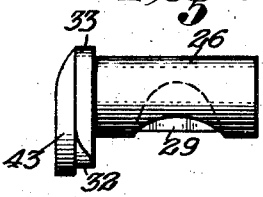
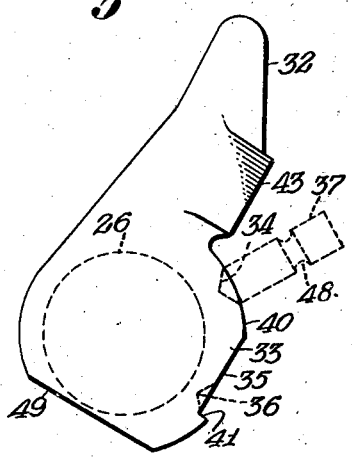
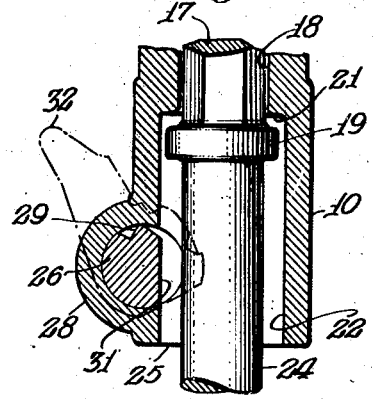
INVENTOR
MATTHEW O'FARRELL
BY
Raymond G. Mullee
ATTORNEY Patented May 14, 1946

2,400,206

UNITED STATES PATENT OFFICE 2,400,206

TOOL RETAINER

Matthew O'Farrell, Detroit, Mich., assignor to Chicago Pneumatic Tool Company, New York, N. Y., a corporation of New Jersey Application April 20, 1944, Serial No. 531,884

5 Claims. (Cl. 279—19.5)

The present invention relates generally to percussive tools of the type having a removable working implement arranged in the front end of the tool in a position to receive impacts from a hammer piston and movable longitudinally to transmit the impacts thus received to the work. It is applicable to rock drills, pavement breakers, demolition tools and the like. More particularly the invention refers to a simple combination of elements, including a working implement retainer serving to prevent accidental removal or loss of the implement from the tool.

The main object of the invention is to provide a tool of the indicated type with a manually controlled implement retainer which is continuously associated with the tool and has an arm or handle by which to manipulate the retainer from latched position in which the working implement is retained in assembled relation with the tool, to released position in which the implement is free to be withdrawn from or inserted into said tool.

Another object is to have an implement retainer which comprises a substantially cylindrical latch member formed with seat portions disposed upon the periphery of a flange at one end of said member adapted to be engaged by a spring pressed plunger to determine latched and released positions of said latch member.

A further object is to avoid the use of conventional bolts and nuts, either for retaining the working implement in association with the tool or for retaining the latch member upon said tool in the operative positions of said member, while allowing removal of said retainer upon rotating the latter beyond its normal operating range of movement.

Other objects and the advantages of the invention will be set forth more fully in detail in the following description when taken in conjunction with the accompanying drawings forming part hereof and in which:

Fig. 4 shows the tool, illustrated in Fig. 2 with the implement retainer rotated into released position and portions of the retainer and associated parts in section to reveal further detail;

Fig. 5 is a view similar to Fig. 4 but showing the implement retainer rotated beyond normal operating range so as to be free for removal from the tool;

Fig. 6 is a fragmentary longitudinal section of part of the front head and working implement, showing the associated implement retainer when the latter occupies the latched position of Figs. 1, 2 and 3;

Fig. 7 is a view similar to Fig. 6 with the implement retainer in the open or released position corresponding to that indicated in Fig. 4;

Fig. 8 is an elevation of the cylindrical portion alone of the implement retainer as viewed from the right in Fig. 6;

Fig. 9 is an elevation of the entire implement retainer also including the handle or lever thereof, when the retainer is rotated downwardly 90 degrees toward the observer; and Fig. 10 is an elevation of the implement retainer on an enlarged scale as viewed from the position occupied in Fig. 2, while the spring pressed plunger cooperating therewith is indicated in broken lines.

In percussive tools wherein removable working implements such as drill steels and the like are interchangeably inserted, the retention of the implement while allowing the same ample latitude for longitudinal reciprocation during operation has constituted a problem which it has been sought to solve by using bolts and nuts as well as other expedients. Such tools, being subject to severe vibration, soon have the nuts and bolts worked loose so as to become ineffective and eventually to drop off the tool, with the result that the implement may then be projected or accidentally removed from the tool as it is then no longer under proper control. Applying implement retainers to such tools and keeping the latter in operative association with said tools by means of nuts and bolts and the like merely postpones the difficulty, for as soon as the vibration of the tool affects the nuts and bolts involved, the retainers themselves become inoperative and may without warning become disassociated from the tool in a manner which causes the operator to lose control of the working implement.

It is now proposed to introduce a manually controlled implement retainer into the structure of a percussive tool of such simple and effective form that the retainer is at all times retained in association with the tool without thought or care being required on the part of the operator, and readily moved from a released or open position in which the working implement may be inserted or removed, to a latched position for retaining said implement at will, without danger of the implement retainer being lost or changing position so as to accidentally release the implement from the tool.

Figure 1:
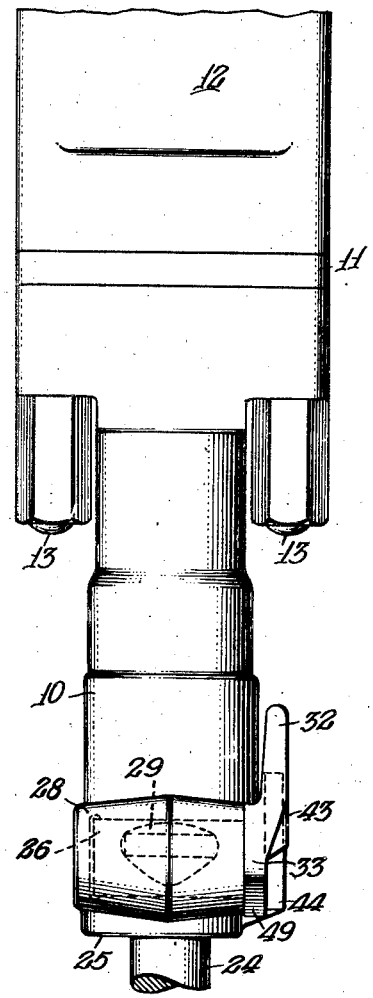
Fig. 1 is an elevation of the front head and part of the associated cylinder of a demolition tool showing the latter equipped with an implement retainer embodying the invention in practical form.

Hence, referring again to the drawings, it will be noted that part of the cylinder and the front head of a conventional type of demolition tool is illustrated in which certain features embodying the invention have been incorporated so as to modify said tool. Upon directing the attention to Fig. 1 it is readily noted that the mechanism of the front head includes a principal supporting element comprising a front head 10 secured to an anvil block bushing 11 and the latter in turn secured to the main tool cylinder 12 by the conventional side bolts 13. The hammer piston 14 (Fig. 2) is reciprocable within cylindrical bore 15 into the end of which bushing 11 is fitted, and during the forward power strokes thereof imparts its blows to anvil block 16 slidably mounted in said bushing. The impacts thus received by the anvil block are directly transmitted to the inner end of the implement or drill steel 17 which is slidably mounted for longitudinal reciprocation in bore 18 of front head 10.

Figure 2:
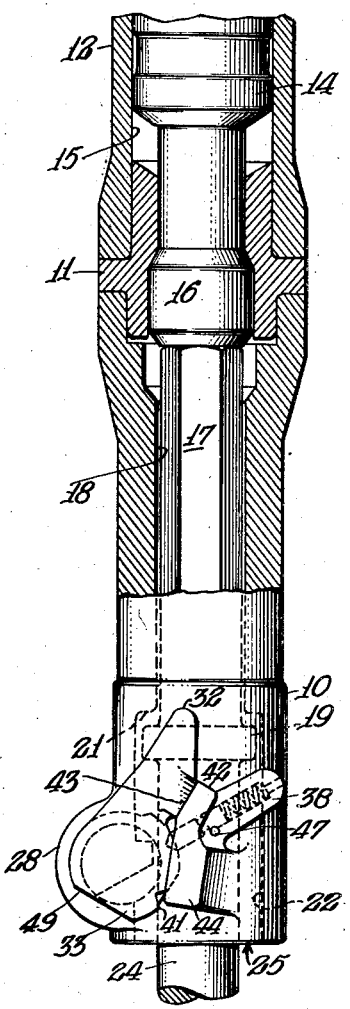
Fig. 2 is another view of the same when rotated 90 degrees upon the longitudinal axis of the tool, the upper portion being shown in section to disclose interior detail while the working implement is disposed in operative position with the implement retainer in latched condition to retain the implement.
Figure 3:
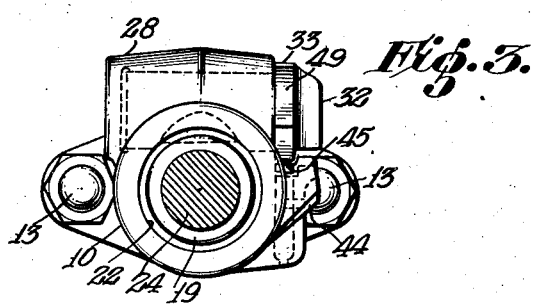
Fig. 3 illustrates the tool in an end view as seen from below in Fig. 1.

It is of course understood that the tool during operation is pressed toward the work so that the parts are maintained constantly in substantially the relation shown in Figs. 2 and 7, in which the annular collar or flange 19 upon the implement is held adjacent to or alternatively against inner shoulder or stop 21 within counterbore 22 in front head 10. The forward working portion 24 of the implement or drill steel has a form suitable for the work to be done (not shown) and being in the meantime driven forwardly through the work. The counterbore 22 is aligned with bore 18 and forms a clearance for flange 19, allowing the working implement to be withdrawn or inserted through the forward extremity 25 thereof at will.

However, in order to retain the implement in association with the tool and yet allow the same ample latitude for operation, means are included which particularly embody the present invention and facilitate release or retention of the implement in convenient manner. Due to the fact that the implement, and therefore also collar or flange 19, reciprocates during operation, a generally cylindrical implement retainer constituting a latch member 26 is spaced forwardly of the inner shoulder 21 to provide for the working space for reciprocation of the flange in counterbore 22, while the latch member is rotatably mounted in the transverse bore 27 in a protruding portion or boss 28 integral with front head 10. The intermediate portion of latch member 26 is formed with a shouldered abutment 29 adapted in one position, hereinafter termed the latched position of the latch member, to lie in the path of, and form a forward retaining stop for, implement flange 19 as shown in Fig. 6. Upon the side opposite said flange is a cut away portion 31 upon abutment 29 serving a purpose which will immediately appear. Thus when the latch member occupies the latched position the implement flange is limited to movement between abutment 29 and inner shoulder 21. The latch member is provided upon one end with an integral arm or handle 32 for rotating said latch member from the latched position of Figs. 1, 2 and 6 to the released or open position indicated in Fig. 4 and shown more clearly in Fig. 7, wherein the cut away portion 31 is shown substantially in line with the side wall of counterbore 22 and the abutment 29 removed from the path of flange 19. In this position of the retainer or latch member, the working implement may be freely drawn out from the forward end 25 of the head for inspection, repairs or replacement.

In order to establish accurate released and latched positions of the latch member and also normally limit the rotation thereof to a working range including said two positions as the extreme limits of said range, the handle is enlarged adjacent the cylindrical portion proper of the latch member to form a flange 33. In the arcuate peripheral portion of the latter is located a detent notch or seat 34 and in a cut away straight portion 35 upon said periphery is formed a second seat or detent notch 36 spaced a distance from the first notch. Both detent notches or seats are individually adapted to be engaged selectively by a plunger 37 slidably mounted in a plunger housing 38 rigid with front head 10 and urged toward the latch flange and the seats therein by a spring 39 in said housing with sufficient force to tend to retain the flange and thereby the latch member in either extreme position of said flange. The seat or notch 34 determines the latched position of the latch member as brought to view in Figs. 1, 2, 3, 6 and 10, the last of these figures showing the handle and integral flange enlarged in full lines and the notches as well as the spring pressed plunger in broken lines. The seats or notches are deep enough in each case to cause the plunger to be raised up on the periphery 40 of the flange when the handle is rotated to offer a slight resistance to manipulation of the latch member by the handle and thus tend to hold the flange in attained position by friction. In the open or released position of the latch member as per Figs. 4 and 7, plunger 37 engages in detent notch 36, the cut away portion 35 being made deep enough in the region of this notch to present a stop 41 immediately adjacent to said notch in order to prevent rotation of the handle beyond said position in normal operation by engagement of the side of the plunger against said stop 41.

It is quite evident that in the latched position of the latch member, the latter should be more positively held against rotation by engagement of the implement flange 19 with latch abutment 29 in extreme forward movement of said implement than is provided for by the mere engagement of the plunger 37 in notch or seat 36. The tool is therefore provided with a fixed abutment or stop 42 integral with front head 10 and plunger housing 38 and disposed in the path of a corresponding projection 43 upon the latch handle, so that the latter projection engages directly against the stationary abutment 42 which thus blocks further clockwise rotation of the latch member beyond the latched position thereof. This construction effectively prevents the latch abutment 29 from being rotated out of the path of the implement flange even if the latter should be projected forwardly with great force against said latch abutment, or if the operator should pull hard against a stuck drill steel, for the latch member will instead be held so positively as to be adequately supported in said latched position and ensure retention of the implement in the tool.

While the latch member thus serves conveniently to release or to retain the implement in operative relation with the tool, provision is also made to retain the latch member itself in operative association with said tool throughout its normal working range by causing flange 33 integral with handle 32 to serve a further purpose than that of carrying the detent notches for engagement by plunger 37. In the side of the forward portion 44 of abutment 42 is cut a retaining slot forming the under cut recess 45 into which flange 33 freely projects in all normal rotated positions of the latch member. Due to the projection of the flange into said recess the latch member is prevented from being displaced longitudinally along its central axis of rotation and is thus positively retained against accidental removal from the tool.

Should it become necessary to remove the latch member for repairs or replacement, handle 32 is first rotated to the open position of Fig. 4, when a screw driver or other tool may be used to push the exposed end of plunger 37 far enough into its housing 38 to withdraw said end from contact with the latch flange and particularly to cause said plunger to clear the flange stop 41. A pin or nail 46 is then thrust into the small drill hole 47 (Fig. 4) to engage in groove 48 formed for this purpose intermediately upon the plunger to retain the latter temporarily in such disengaged position. With the flange thus free from the plunger, the handle is readily swung out to the position illustrated in Fig. 5, in which a cut away or clearance portion 49 upon flange 43 clears the abutment portion 44 on the front head 10, and the latch axially withdrawn by its handle and flange from portion 28 of said front head. Restoration of the latch member is accomplished by again inserting the same into bore 27 in portion 28 while the handle 32 projects outwardly in the position shown in Fig. 5. When the latch member is fully inserted it is rotated by the handle to any position ranging from that of Fig. 4 to that of Fig. 2, when the pin 46 may be withdrawn to allow the plunger again to engage against the flange in normal manner. During the original assembling of the tool, the last described procedure may be followed if it is assumed that the spring and plunger are first inserted into plunger socket or housing 38 and the pin inserted in the drill hole 37 to hold the plunger in withdrawn position. When the spring, plunger and latch member are once assembled upon the tool, with the plunger resiliently engaging the latch flange, the latch member will be constantly retained in operative association with said tool for manually controlling the retention and release of the working implement with respect to said tool, at will.

What is claimed is:

1. In a percussive tool having a front head with a longitudinal bore adapted to receive a longitudinally reciprocable working implement, a cylindrical transverse bore in said front head intersecting said longitudinal bore and a substantially cylindrical implement retaining element rotatably mounted in the transverse bore, the mentioned retaining element being formed upon the body portion within the periphery thereof with a stop portion and being reversibly rotatable from non-cooperative relation to cooperative relation with the working implement and provided with a projecting handle rigid with said retaining element lying outside one end of said transverse bore and by which to manipulate and control the retaining element, the combination of a flange rigid with said handle, a pair of detent portions spaced angularly apart upon said flange, a resiliently urged detent member operatively mounted on said front head in a position to engage individually with said detent portions to establish a working range including two distinct rotated positions of said retaining element respectively corresponding to said non-cooperative and cooperative relations of the latter with said working implement, a stop means fixed on said flange adjacent to the detent portion which corresponds to the non-cooperative relation of the retaining element with said working implement in released position of the latter, said stop means comprising a radially extending shoulder positioned to engage against the detent member and having sufficient depth to positively prevent rotation of the retaining element in one direction beyond the last mentioned detent portion, and means on said front head for preventing rotation of the retaining element in the opposite direction beyond the position of the latter which corresponds to the cooperative relation thereof with the working implement.

2. In a percussive tool having a front head with a longitudinal bore adapted to receive a longitudinally reciprocable working implement, a cylindrical transverse bore in said front head intersecting said longitudinal bore and a substantially cylindrical implement retaining element rotatably mounted in the transverse bore, the mentioned retaining element being formed upon the body portion within the periphery thereof with a stop portion and being reversibly rotatable from non-cooperative relation to cooperative relation with the working implement and provided with a projecting handle rigid with said retaining element lying outside one end of said transverse bore and by which to manipulate and control the retaining element, the combination of projecting means rigid with one end of the retaining element, movable means operatively associated with said front head for engaging with said projecting means to establish a working range including two distinct rotated positions of said retaining element respectively corresponding to said non-cooperative and cooperative relations of the latter with said working implement, rigid means upon said front head obstructing a portion of said projecting means in said working range in axial direction to prevent axial displacement of the retaining element, and a cut away clearance portion disposed on said projecting means in a position to register with said rigid means and clear the latter when said retaining element is rotated in a predetermined manner beyond said range in order to allow withdrawal of the latter element axially from the transverse bore in said front head.

3. A percussive tool according to claim 2, wherein the projecting means rigid with one end of the retaining element comprises a flange member having a pair of detent portions spaced a predetermined angular distance apart, and the movable means operatively associated with said front head includes a spring biased plunger having one end directed toward and engaging with said flange member.

4. In a percussive tool a front head having a longitudinal bore for the reception of a collared working implement and having a transverse bore communicating with said longitudinal bore, an adjustable latch element mounted in said transverse bore and having a shouldered abutment adapted to engage the collar of the implement to lock the latter against separation from the front head, said latch element being rotatable within a working range to establish a locking relation of the shouldered abutment to the collar at one limit of the working range and a releasing relation at the other limit of the working range, a spring pressed detent mounted in said front head, a flange on the latch element engageable with the detent and having two spaced depressions adapted respectively to receive the detent when the latch is at either end of its working range and thereby to yieldingly hold the latter against rotation in its selected position of adjustment, a locking shoulder on said flange adjacent one of the depressions, said shoulder being engagable with the detent and having sufficient radial depth to provide a positive stop preventing turning movement of the latch element in one direction beyond the working range, means for disabling the detent and for holding it against spring pressure to permit rotation of the locking shoulder past the detent, rigid means upon the front head obstructing the latch element to prevent axial displacement of the latter from the front head in the operative positions of said latch element, and a cut away clearance portion disposed upon the latch element in a position to register with said rigid means and clear the latter in a predetermined rotated position of said latch element in order to allow withdrawal of the latter axially from the transverse bore in the front head.

5. A percussive tool according to claim 4 in which the means for holding the detent in disabled position includes a pin supported by the front head and engageable with a grooved portion of the detent.

MATTHEW O'FARRELL.